(12) United States Patent
Diard et al.

(10) Patent No.: US 7,768,517 B2
(45) Date of Patent: Aug. 3, 2010

(54) ASYMMETRIC MULTI-GPU PROCESSING

(75) Inventors: Franck R. Diard, Mountain View, CA (US); Hassane S. Azar, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 845 days.

(21) Appl. No.: 11/358,611

(22) Filed: Feb. 21, 2006

(65) Prior Publication Data

US 2007/0195099 A1    Aug. 23, 2007

(51) Int. Cl.
    *G06T 15/00*    (2006.01)
(52) U.S. Cl. .................. 345/502; 345/530; 341/51; 348/441; 348/461; 348/564; 725/38; 725/40
(58) Field of Classification Search .............. 345/419, 345/502, 530, 629; 341/51; 348/441, 461, 348/564; 725/37, 38, 39, 40, 41
See application file for complete search history.

(56) References Cited

U.S. PATENT DOCUMENTS

| 5,860,086 | A | 1/1999 | Crump et al. | |
| 6,359,624 | B1 | 3/2002 | Kunimatsu | |
| 6,473,087 | B1 | 10/2002 | Tsang | |
| 6,556,197 | B1 * | 4/2003 | Van Hook et al. | 345/419 |
| 6,624,816 | B1 | 9/2003 | Jones, Jr. | |
| 6,661,422 | B1 * | 12/2003 | Valmiki et al. | 345/530 |
| 6,789,154 | B1 | 9/2004 | Lee et al. | |
| 7,110,006 | B2 * | 9/2006 | MacInnis et al. | 345/629 |
| 7,129,860 | B2 * | 10/2006 | Alvarez et al. | 341/51 |
| 7,289,125 | B2 * | 10/2007 | Diard et al. | 345/501 |
| 7,337,205 | B2 * | 2/2008 | Sazegari | 708/607 |
| 7,421,694 | B2 * | 9/2008 | Gosalia et al. | 718/104 |
| 7,525,548 | B2 * | 4/2009 | Azar et al. | 345/504 |

(Continued)

FOREIGN PATENT DOCUMENTS

EP    0 584 982    3/1994

(Continued)

OTHER PUBLICATIONS

Sommefeldt, Ryszard. "NVIDIA's SLI—An Introduction," Nov. 22, 2004, retrieved from http://www.hexus.net/content/item.php?item=916&page=1.
European Examination Report, EP App. No. 06 022 906.9-2202, Jul. 1, 2009.
David V. James, "Scalable I/O Architecture for Buses", Apple Computer. Feb. 27-Mar. 3, 1989. IEEE Comp. Soc. Press, US, vol. CONF. 34, Feb. 27, 1989, pp. 539-544.

(Continued)

*Primary Examiner*—Phu Nguyen
(74) *Attorney, Agent, or Firm*—Patterson & Sheridan, LLP

(57) ABSTRACT

A system for processing video data includes a host processor, a first media processing device coupled to a first buffer, the first media processing device configured to perform a first processing task on a frame of video data, and a second media processing device coupled to a second buffer, the second media processing device configured to perform a second processing task on the processed frame of video data. The architecture allows the two devices to have asymmetric video processing capabilities. Thus, the first device may advantageously perform a first task, such as decoding, while the second device performs a second task, such as post processing, according to the respective capabilities of each device, thereby increasing processing efficiency relative to prior art systems. Further, one driver may be used for both devices, enabling applications to take advantage of the system's accelerated processing capabilities without requiring code changes.

25 Claims, 5 Drawing Sheets

U.S. PATENT DOCUMENTS

| | | | | |
|---|---|---|---|---|
| 7,533,382 B2* | 5/2009 | Karim | | 718/100 |
| 7,587,437 B2* | 9/2009 | Orii | | 708/200 |
| 7,617,494 B2* | 11/2009 | Rovati et al. | | 717/159 |
| 7,624,107 B1* | 11/2009 | Le Grand | | 707/7 |
| 2002/0101930 A1 | 8/2002 | Wang et al. | | |
| 2002/0118201 A1 | 8/2002 | Mukherjee et al. | | |
| 2005/0190190 A1 | 9/2005 | Diard et al. | | |

FOREIGN PATENT DOCUMENTS

| | | |
|---|---|---|
| EP | 0627700 | 12/1994 |
| JP | 2000312308 | 11/2000 |
| JP | 2001343927 | 12/2001 |

OTHER PUBLICATIONS

Colaitis, et al. "The Implementation on P³I, a Parallel Architecture for Video Real-Time Processing: A Case Study", Proceedings of the IEEE. New York, US. vol. 84, No. 7, Jul. 1996.

Hermann Schomberg. "A Transputer-Based Shuffle-Shift Machine for Image Processing and Reconstruction", Proceedings of the International Conference on Pattern Recognition. Atlantic City, Jun. 16-21, 1990. pp. 445-450.

* cited by examiner

Command buffer of GPU 2

Command buffer of GPU 1

ASYMMETRIC MULTI-GPU PROCESSING

BACKGROUND OF THE INVENTION

1. Field of the Invention

Embodiments of the present invention relate generally to computer graphics and more specifically to asymmetric multi-GPU processing.

2. Description of the Related Art

Computer graphics image data typically undergoes several processing steps before being displayed on a display device. Each processing step further refines the image data, however, each processing step also adds processing time required for each frame of data. For example, typical processing steps include two-dimensional (2-D) and three-dimensional (3-D) processing. A subset of computer graphics data is video image data. Video image data may be processed with several process steps as well. One example of video image data is image data related to digital video disks (DVDs).

Video image data, unlike typical computer graphics image data, is displayed at sixty frames per second. Therefore, the video image processing procedures for the video data must execute in less time than the time required to display one frame of video data (approximately 16.67 milliseconds). If the time required to process a frame of video data is greater than the time required to display a frame of video data, then the processed video data cannot be displayed. Instead, previous video data is often shown in place of the current video data. This phenomenon is commonly referred to as "dropping" video frames and is quite undesirable because it results in poor video quality.

A graphics processing unit (GPU) is often configured to provide the video image processing that is required for video image data before such data can be displayed. For example, the GPU may be configured to use its 3-D processing unit and 2-D processing unit to process the video image data. Since, as described above, the display frame rate limits the amount of time available to process each frame and since each video image processing task increases overall processing time, the number and complexity of the image processing procedures that may be executed on single GPU is limited. Exacerbating this problem is the fact that high definition video images require processing up to six times more pixels than standard definition images. Increasing the pixel count increases the amount of time required to perform each processing procedure, thereby further limiting the number of video image processing procedures a single GPU can apply to a frame of image data without dropping the video frame.

One approach to reducing overall processing time has been to configure multiple GPUs to work in parallel to process a single video frame. This approach generally entails using functionally identical GPUs to simultaneously process different portions of a video frame to increase the throughput of a video processing system. One drawback to this approach is the constraint that the GPUs be functionally identical. For example, if a computing system includes a first GPU, and a user wants to add a second GPU, unless the user adds a second GPU that is functionally identical to the first GPU, the GPUs are not able to work in parallel as envisioned by this approach.

As the foregoing illustrates, what is needed in the art is a way to increase video processing throughput without placing such undesirable design constraints on video processing systems.

SUMMARY OF THE INVENTION

One embodiment of the present invention sets forth a system for processing video data. The system includes a host processor and a first media processing device coupled to a first buffer, where the first buffer is configured to store a frame of video data, and the first media processing device is configured to perform a first processing task on the frame of video data. The system also includes a second media processing device coupled to a second buffer, where the second buffer is configured to store the processed frame of video data, and the second media processing device is configured to perform a second processing task on the processed frame of video data.

One advantage of the disclosed system is that overall video processing may be divided into separate video processing tasks, where the first media processing device performs one video processing task on the frame of video data, such as decoding, while the second media processing device performs another video processing task on the frame of video data, such as a post processing operation. With this approach, multiple video frames may be processed simultaneously by the media processing devices, thereby increasing overall processing efficiency relative to prior art video processing systems.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention reduces the overall time required to process image data, such as video image data, by distributing the various image processing tasks among two or more GPUs. A software driver may be configured to optimize the distribution of processing tasks to the individual GPUs by matching each specific processing task to the GPU best suited for that task.

Figure 1:
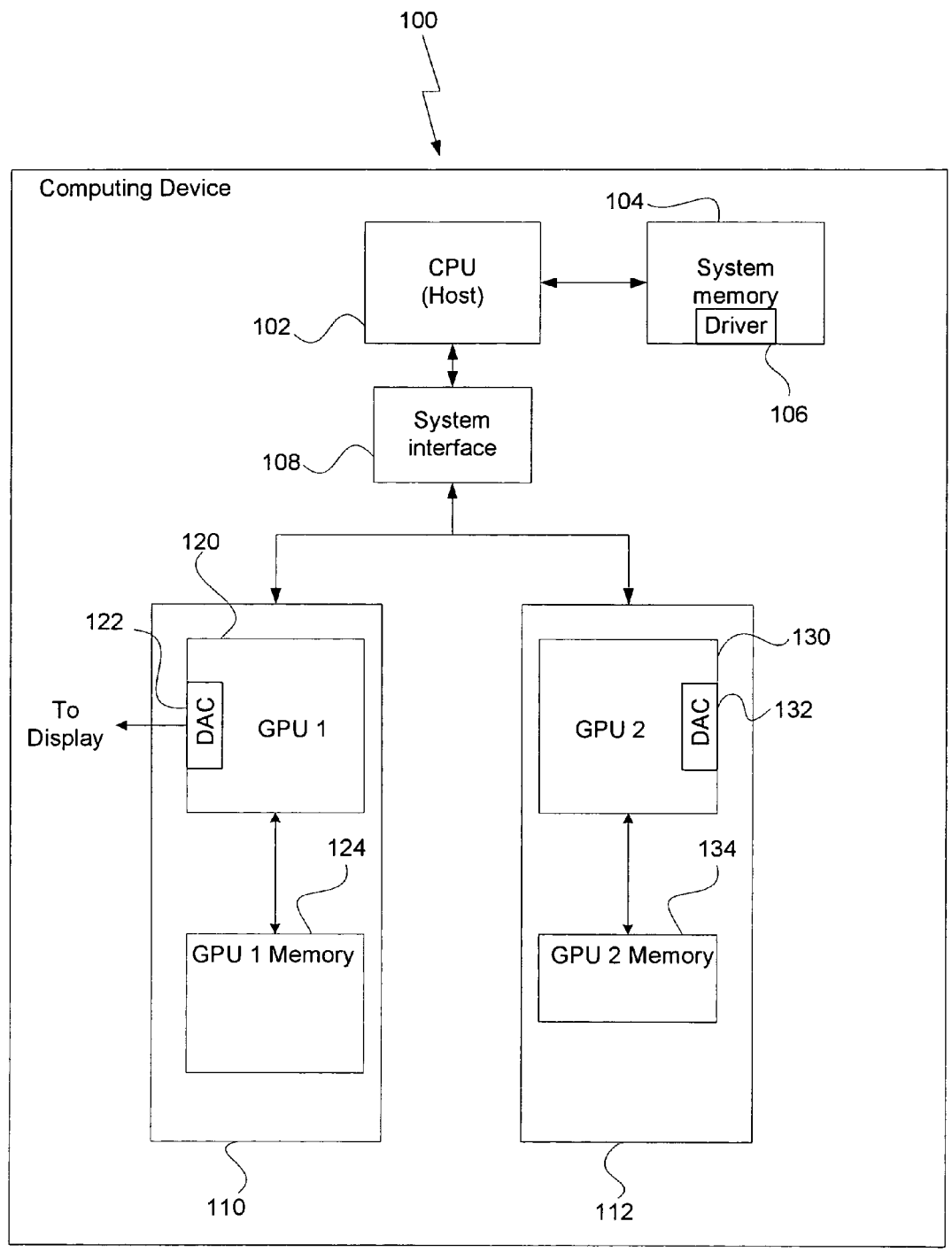
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes, without limitation, a central processing unit (CPU) 102, system memory 104, a bus interface 108, a first graphics subsystem 110 and a second graphics subsystem 112. The computing device 100 may be a desktop computer, server, laptop computer, palm-sized computer, tablet computer, game console, cellular telephone, computer-based simulator or the like. The CPU 102 may be used to execute software programs, such as a software driver 106, that configure the graphics subsystems 110 and 112 to process image data. The CPU 102 is coupled to the system memory 104, which may be used to store data and programs such as the software driver 106. The CPU 102 is further coupled to a system interface 108 which may be a bridge device and/or an input/output interface. The system interface 108 is also coupled to the first graphics subsystem 110 and the second graphics subsystem 112.

The first graphics subsystem 110 includes a first GPU 120 coupled to a first GPU memory 124, which is configured to store graphics programs, commands and image data. The first GPU 120 includes a digital to analog converter (DAC) 122. Traditionally, DACs are used to transmit analog processed image data from a GPU to a display device such as a VGA capable monitor. Other means for transmitting processed image data include a digital video interface (DVI) and a serial digital interface (SDI). These other means are now typically included within the DAC. A display device is coupled to the DAC 122 (not shown) for displaying the video image once processing is completed.

The second graphics subsystem 112 includes a second GPU 130 coupled to a second GPU memory 134. Importantly, this second GPU 130 does not have to be functionally identical to the first GPU 120, meaning that the two GPUs may have different processing capabilities. Further, the second GPU memory 134 does not need to be the same size as the first GPU memory 124. The differences between the first GPU 120 and the second GPU 130 and between the first GPU memory 124 and the second GPU memory 134 are described in greater detail below in conjunction with FIG. 2. Persons skilled in the art will understand, however, that in certain embodiments, the two GPUs may be functionally identical and/or the two GPU memories may be the same size.

Typically, there are several separate processing steps performed on video image data before that data can be displayed. For example, video image data may require decoding and then post processing prior to being displayed. In a system with multiple GPUs capable of processing video image data, such as computing device 100, the functionality for decoding the video image data may be provided by a video processing functional unit within one of the available GPUs, such as the second GPU 130. On the other hand, a 3-D functional unit within another available GPU, such as the first GPU 120, may provide the post processing functionality. Tasks such as decoding and post processing are generally independent and need not occur simultaneously. Thus, as described in greater detail herein, the software driver 106 may take advantage of the non-symmetric nature of the GPUs in a particular computing device and try to assign each image processing step to the GPU best suited for that particular step.

Figure 2:
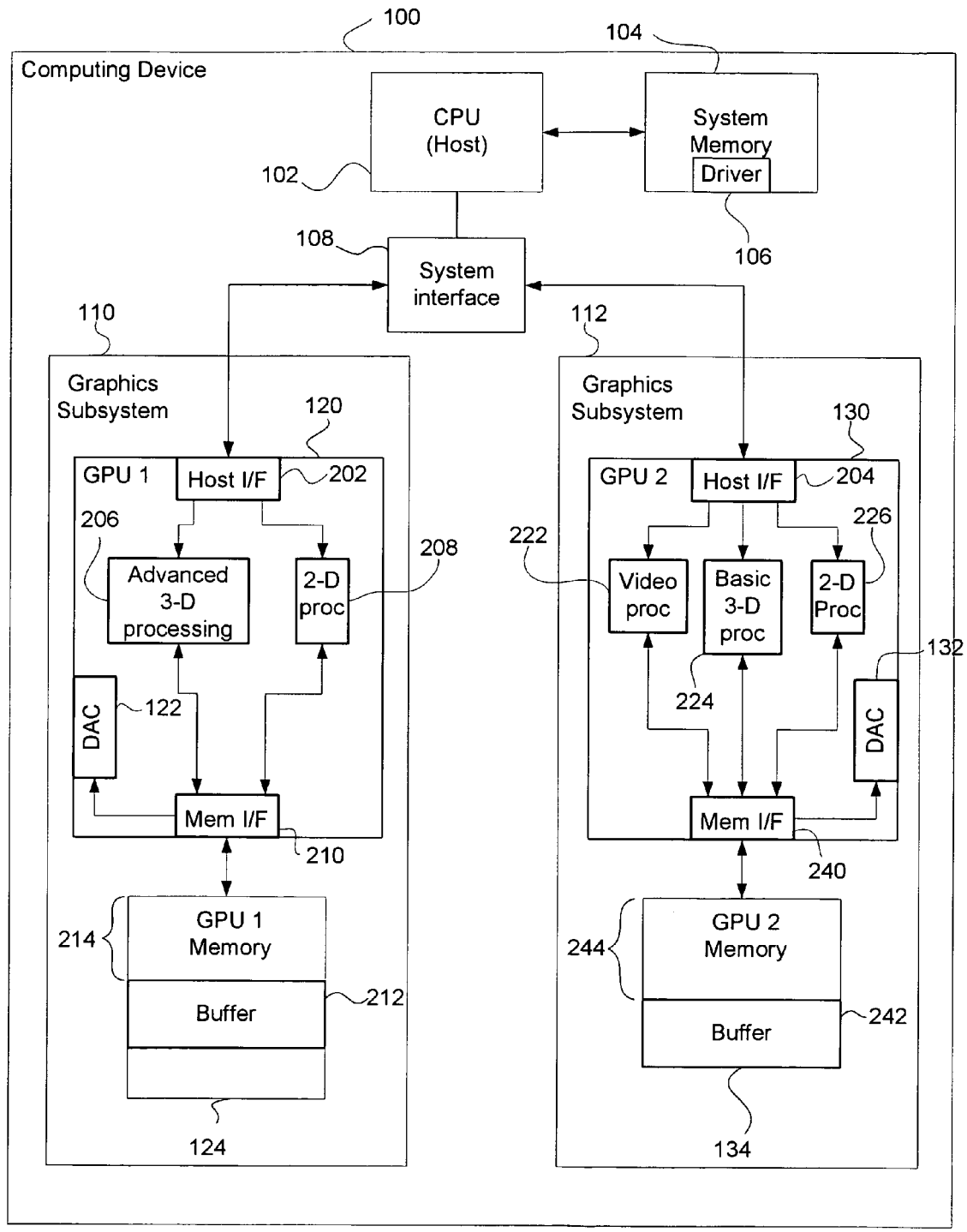
FIG. 2 is a more detailed diagram of the computing device of FIG. 1, according to one embodiment of the invention.

FIG. 2 is a more detailed diagram of the computing device 100 of FIG. 1, according to one embodiment of the invention. In particular, the first GPU 120, the second GPU 130, the first GPU memory 124 and the second GPU memory 134 are illustrated in greater detail. As shown, the first GPU 120 includes, without limitation, a host interface 202, an advanced 3-D processing unit 206, a 2-D processing unit 208, a memory interface 210 and a DAC 122. The host interface 202 is coupled to the system interface 108 and enables the transfer of GPU instructions and data from the CPU 102 to the first GPU 120. The advanced 3-D processing unit 206 provides enhanced 3-D processing functionality, such as 3-D acceleration for rendering and shading of 3-D graphical image data. Such 3-D functionality may be used, for example, to provide edge-enhancement and other types of post processing typically required for video images. The 2-D processing unit 208 provides 2-D processing functionality required for certain graphics programs such as spreadsheets and word processing programs. Such 2-D processing functionality may also be used for video image processing to insert sub-title information commonly required when processing DVD data. The memory interface 210 couples the 3-D processing unit 206, the 2-D processing unit 208 and the DAC 122 to the first GPU memory 124. The software driver 106 defines a first buffer 212, which is a region within the first GPU memory 124 where image data for the first GPU 120 may be stored. The first buffer 212 is located by a first memory offset 214, which represents how far the first buffer 212 is offset from an arbitrary datum. In this exemplary case, the first memory offset 214 locates the first buffer 212 with respect to the "beginning" of the first GPU memory 124. In other embodiments, other datums may be used, such as the "end" of first GPU memory 124.

As previously described, the second GPU 130 does not need to have the same functional capabilities as the first GPU 120. In this exemplary case, the second GPU 130 includes a host interface 204 and a 2-D processing unit 226 similar to the host interface 202 and the 2-D processing unit 208 within the first GPU 120. However, the second GPU 130 differs from the first GPU 120 in that the second GPU 130 also includes a video processing unit 222 and a basic 3-D processing unit 224. The video processing unit 222 provides enhanced video processing functionality such as decoding. The basic 3-D processing unit 224 provides some 3-D acceleration functionality; however, the 3-D processing capabilities of the basic 3-D processing unit 224 are typically inferior to the 3-D processing capabilities of the advanced 3-D processing unit 206 of the first GPU 120. Again, the memory interface 240 couples the video processor 222, the basic 3-D processor 224 and the 2-D processor 226 to the second GPU memory 134. The software driver 106 defines a second buffer 242, which is a region within the second GPU memory 134 where video image data for the second GPU 130 may be stored. The second buffer 242 is located by a memory offset 244, which represents how far the second buffer 242 is offset from an arbitrary datum. Again, in this exemplary case, the memory offset 244 locates the second buffer 242 with respect to the "beginning" of the second GPU memory 134, but in other embodiments, other datums may be used, such as the "end" of second GPU memory 134.

Returning to the example set forth at the end of the FIG. 1 discussion, the software driver 106 may be configured to identify the separate tasks that need to be performed to process the video image data—here, decoding and post processing. The software driver may also be configured to identify the different processing units included within each of the first GPU 120 and the second GPU 130 within the computing device 100. Since overall video processing may be divided into separate video processing tasks, the software driver 106 may distribute the decoding and post processing tasks to the two GPUs such that each of these tasks is assigned to the GPU best suited for the particular task. Thus, in the exemplary case and for purposes of discussion only, the software driver 106 configures the second GPU 130 to perform the video decoding task within the video processor 222 and the first GPU 120 to perform the video post processing task within the advanced 3-D processor 206.

Since the software driver 106 separates the processing of the video image data into separate processing tasks that are matched to the GPU best suited for each particular task, the software driver 106 may configure the first GPU 120 and the second GPU 130 to perform the separate video processing tasks serially. Continuing the example set forth above, video image processing begins within the second GPU 130, where an encoded frame of video data is transmitted to and stored within the second buffer 242. The second GPU 130 then performs decoding operations on the frame of video data to decode the video data. When this task is completed, the decoded frame of video data is transmitted from the second buffer 242 to the first buffer 212. Then, the first GPU 120 performs post processing operations on the decoded frame of video data to complete the processing of the video data. Once processing is completed, the processed frame of video data may be transmitted to a display device for display. In this embodiment, because a processing task related to a particular frame of video data, such as decoding, is completed within the second GPU 130 and then the processed video image data is transmitted to the first GPU 120 for further processing, another frame of video data may be decoded by the second GPU 130 while post processing operations are performed on the first frame of video data by the first GPU 120. Thus, the computing device 100 may be advantageously configured to process video frames in this serial fashion so that multiple frames of video data may be processed simultaneously by the first GPU 120 and the second GPU 130. The process of one GPU completing a processing task and another GPU performing the following processing task is described in greater herein.

Figure 3:
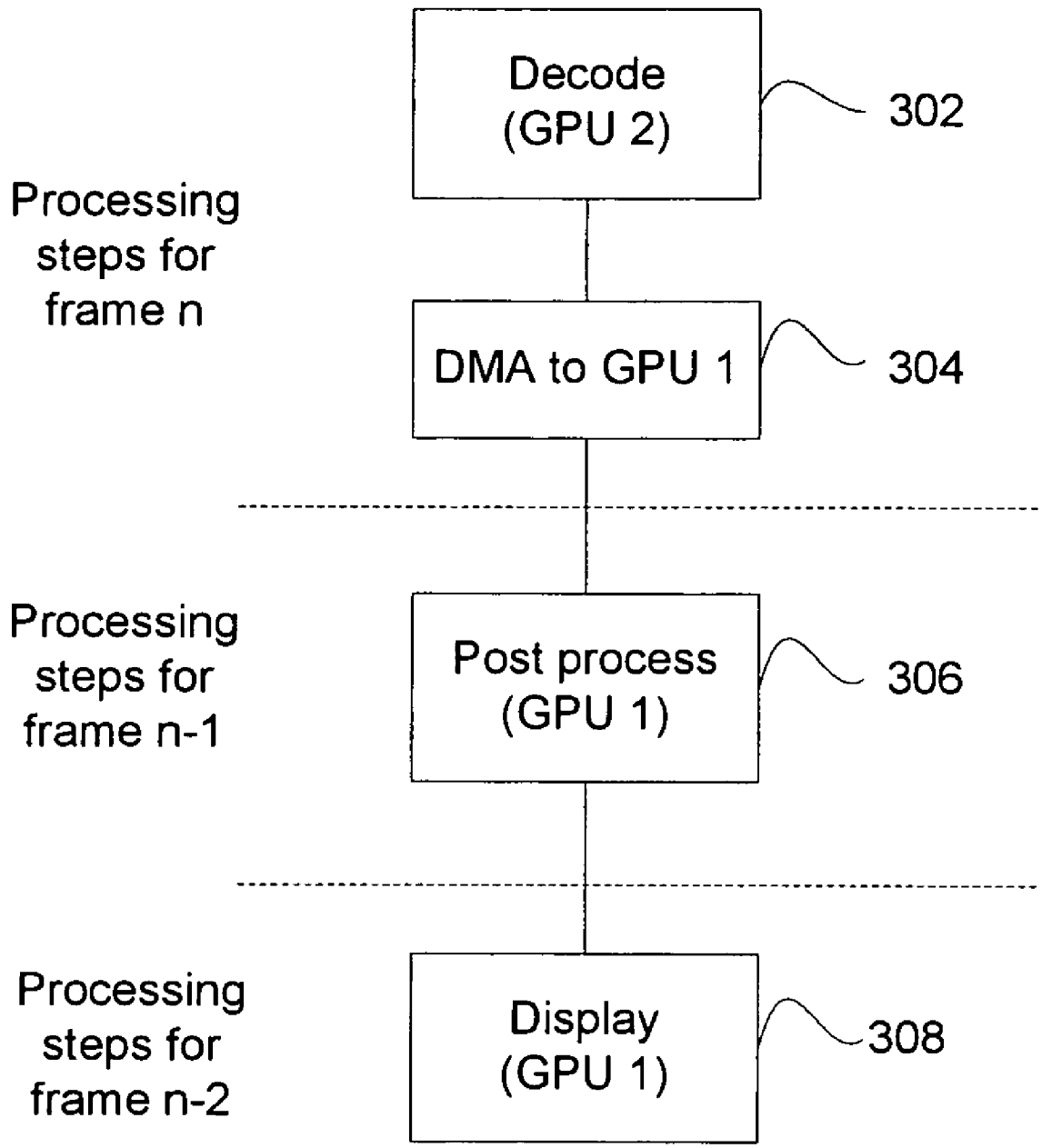
FIG. 3 is a conceptual diagram illustrating how the software driver distributes video processing tasks between the first GPU and the second GPU, according to one embodiment of the invention.

FIG. 3 is a conceptual diagram illustrating how the software driver 106 distributes video processing tasks between the first GPU 120 and the second GPU 130, according to one embodiment of the invention. As previously described, the software driver 106 is configured to divide overall video processing into separate video processing tasks and assign each separate task to the GPU that is best suited for the particular video processing task. The particular video processing task is then executed by the assigned GPU on the video image data within the buffer associated with that GPU.

Returning to the example set forth above, the software driver 106 separates overall video processing into a decoding task and a post processing task. The software driver 106 configures the second GPU 130 to perform the decoding task because the second GPU 130 includes the video processing unit 222, which is best suited for the task of decoding. Again, an encoded frame of video data is stored in second buffer 242. These steps are reflected in FIG. 3 with element 302. The software driver 106 also configures the second GPU 130 to transfer the decoded video data from the second buffer 242 to the first buffer 212. In one embodiment, the video data is transferred through a process known in the art as direct memory access (DMA) copy operation. Such an operation is commonly referred to as a "blit," and, in this fashion, the second GPU 130 effectively "pushes" the decoded video data from the second buffer 242 to the first buffer 212. The transfer of video image data between the two buffers is shown in FIG. 3 with element 304. As persons skilled in the art will understand, one way that different memory sizes is supported is through separate memory offsets for each buffer. The offsets specifically locate the buffers within the GPU memories so that the video data may be accurately transmitted from the second buffer 242 to the first buffer 212 and vice versa.

Finally, the software driver 106 configures the first GPU 120 to perform the post processing task on the decoded frame of video data, as shown by element 306 in FIG. 3, since the first GPU 120 includes the advanced 3-D processing unit 206, which is the processing unit best suited for the post processing task. After performing the post processing task on the decoded video data in the first buffer 212, the first GPU 120 transmits the processed frame of video image data to the display device for display, as shown by element 308. One should note that since the first GPU 120 contains the DAC 122, which is coupled to the display device, the video image data does not need to be transmitted to a different GPU memory prior to being transmitted to a display device.

Since overall video processing is divided into separate video processing tasks, multiple video frames may be processed simultaneously processed by the first GPU 120 and the second GPU 130. The upper portion of FIG. 3 shows the decoding task for frame n being performed by the video processing unit 222 in the second GPU 130. The center portion of FIG. 3 shows the post processing task for a preceding frame of video data, frame n−1, being performed by the advanced 3-D unit 206 in the first GPU 120 at the same time the video processing unit 222 is performing the decoding task on frame n. Likewise, the bottom portion of FIG. 3 shows a second preceding frame of video data, frame n−2, being transmitted to the display device by the first GPU 120 while the advanced 3-D unit 206 is performing the post processing task on frame n−1 and the video processing unit 222 is performing the decoding task on frame n.

Figure 4:
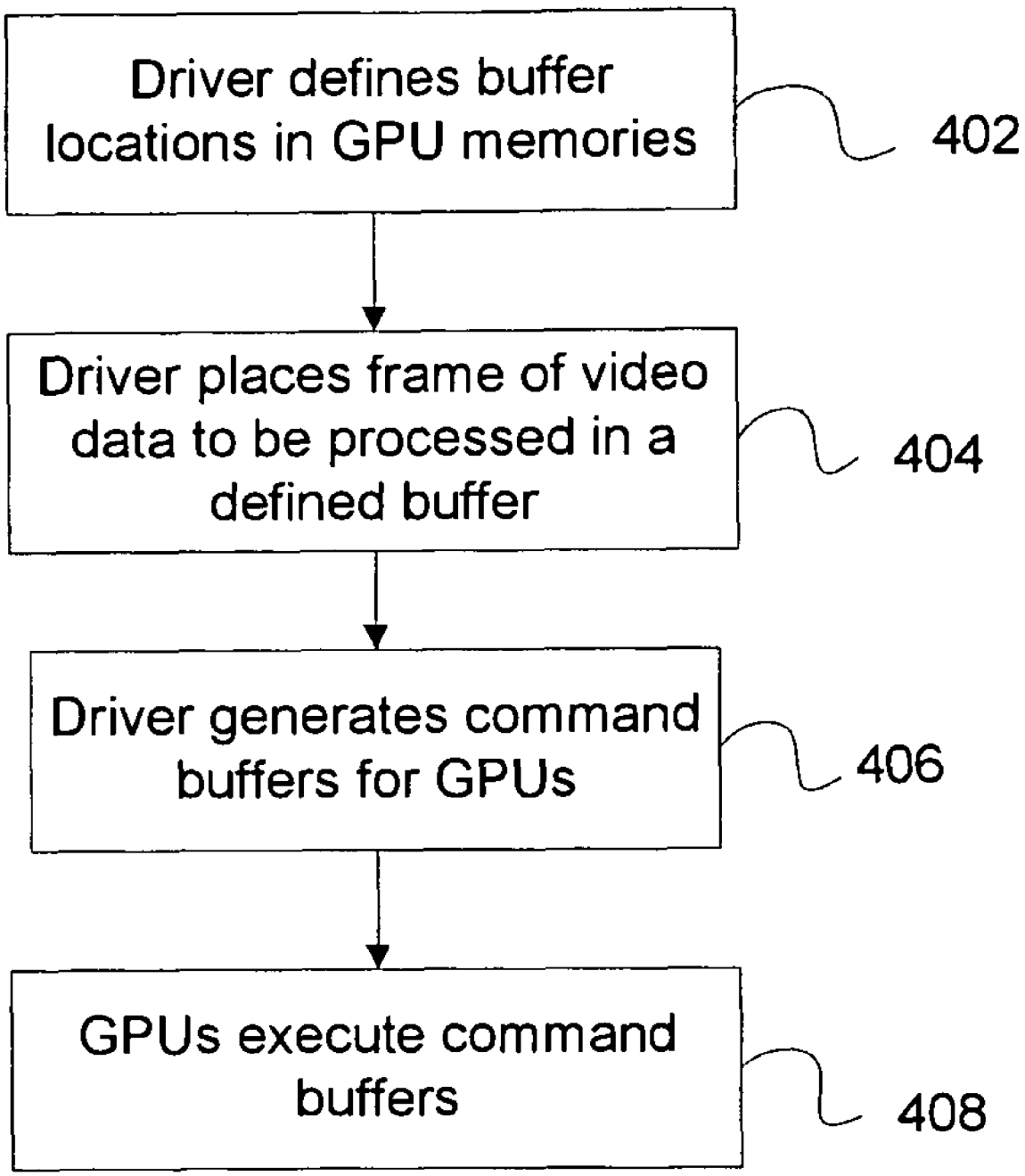
FIG. 4 is a flow diagram of method steps for generating GPU command buffers and defining buffers, according to one embodiment of the invention; and, FIGS. 5A and 5B are conceptual diagrams of command buffers containing a sequence of commands that synchronize the first GPU and the second GPU, according to one embodiment of the invention.

In order for the first GPU 120 and the second GPU 130 to perform their respective video processing tasks, the software driver 106 generates a command buffer for each GPU that configures that GPU to perform its assigned video processing task on the video data. The software driver 106 also defines the buffers for each GPU. FIG. 4 is a flow diagram of method steps for generating GPU command buffers and defining buffers, according to one embodiment of the invention. Persons skilled in the art will recognize that any system configured to perform the method steps in any order is within the scope of the invention.

The method begins in step 402, where the software driver 106 defines the buffer regions in the GPU memories. Thus, the software driver 106 defines the first buffer 212 in the first GPU memory 124 and the second buffer 242 in the second GPU memory 134. Generally, each separate video processing task is performed on specific frame of video image data. As persons skilled in the art will appreciate, the video data being processed may not be shared with other video processing tasks. Therefore, each video processing task may require a separate buffer region within the first GPU 124 or the second GPU memory 134, as the case may be. Further, as previously described herein, each of the first buffer 212 and the second buffer 242 may have an associated memory offset (offsets 214 and 244, respectively) to facilitate the transfer of video data from one buffer to the other. The method continues with step 404, where the software driver 106 places the frame of video image data to be processed into one of the defined buffers. Returning again to the exemplary case set forth above, since the first video processing task is decoding, which is being performed by the second GPU 130, the software driver 106 places an encoded frame of video image data in second buffer 242. In step 406, the software driver 106 generates command buffers for the GPUs. Command buffers contain GPU instructions that, among other things, configure the GPUs to perform their respective video processing tasks. Thus, the software driver 106 generates a command buffer for the second GPU 130 that includes the instructions necessary for decoding the frame of video data and a command buffer for the first GPU 120 that includes the instructions necessary for performing post processing operations on the decoded frame of video data. Finally, in step 408, the software driver 106 directs the GPUs to execute their respective command buffers.

When a first video processing task (e.g., decoding) is performed by the second GPU 130 on a frame of video data within the second buffer 242, and a second video processing task (e.g., post processing) is performed by the first GPU 120 on the processed frame of video data within the first buffer 212, as described above, the processed frame of video data is transferred from the second buffer 242 to the first buffer 212 before the first GPU 120 begins performing the second video processing task on the processed frame of video data. To accomplish this processing sequence, the first GPU 120 begins performing the second video processing task only after the second GPU 130 indicates to the first GPU 120 that the processed frame of video data has been completely transferred from the second buffer 242 to the first buffer 212. The mechanism for synchronizing the GPUs in this fashion is described below in connection with FIGS. 5A and 5B.

Figure 5A:
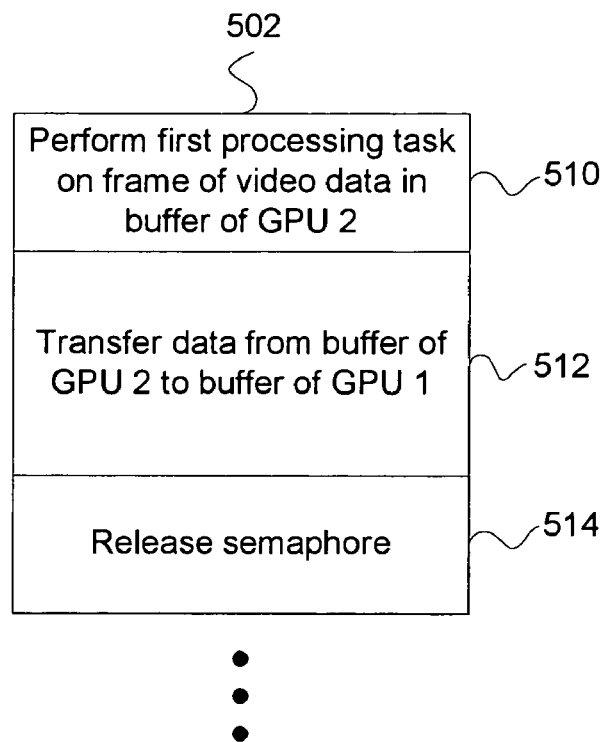
Figure 5B:
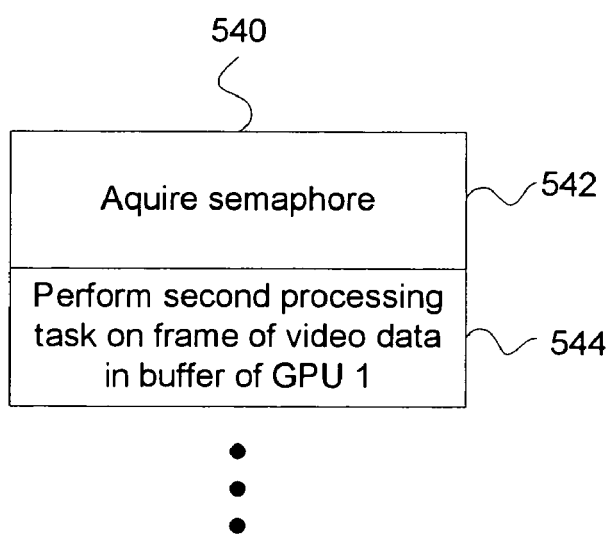

FIGS. 5A and 5B are conceptual diagrams of command buffers containing a sequence of commands that synchronize the first GPU 120 and the second GPU 130, according to one embodiment of the invention. FIG. 5A illustrates a command buffer 502 containing commands that are executed by the second GPU 130. Specifically, the commands within the command buffer 502 cause the second GPU 130 to process a frame of video data within the second buffer 242, transfer the processed frame of video data to the first buffer 212 and release a semaphore to synchronize the first GPU 120 and the second GPU 130. A first command 510 represents the one or more individual GPU commands that configure the second GPU 130 to perform a first video processing task. Again, in the exemplary case, this first video processing task is a decoding task. The second GPU 130 performs this video processing task upon the video image data stored within the second buffer 242. When the video processing task is complete, the second GPU 130 transfers the processed video data from the second buffer 242 to the first buffer 212, as shown by command 512. A release semaphore command 514 causes the second GPU 130 to release a semaphore.

The software driver 106 uses semaphores to synchronize the first GPU 120 and the second GPU 130 enabling the GPUs to perform separate video processing tasks in the first buffer 212 and the second buffer 242. A semaphore is a pointer to a specific address in system memory. A semaphore may be released or acquired. When a GPU executes a release semaphore command, the GPU writes a specific value to the memory location associated with the semaphore. When a GPU executes an acquire semaphore command, the GPU reads the memory location associated with the semaphore and compares the value of that memory location with the value reflected in the acquire semaphore command. The two values not matching indicates that the semaphore associated with the acquire semaphore command has not yet been released. If there is no match, the GPU executing the acquire semaphore command continues reading the memory location associated with the semaphore until a match is found. Consequently, the GPU executing the acquire semaphore command does not execute any additional commands contained in the command buffer until a match is found. For example, assume that a first GPU is directed to release a semaphore having a value of 42 and then a second GPU is directed to acquire the semaphore having a value of 42. The second GPU will continue reading the system memory location associated with the semaphore until that memory location has a value of 42. Importantly, the second GPU will not execute the next buffer command until the memory location has value of 42, and the memory will have a value of 42 only when the first GPU releases the semaphore having a value of 42.

FIG. 5B is a conceptual diagram of a command buffer 540 containing a sequence of commands that are executed by the first GPU 120. A first command 542 instructs the first GPU 120 to acquire the semaphore that was released by the second GPU 130 during the execution of the command buffer 502. The first GPU 120 does not execute any commands beyond command 542 until the semaphore is acquired. Importantly, since the second GPU 130 does not release the semaphore until after the frame of video data is transferred from the second buffer 242 to the first buffer 212, the first GPU 120 does not perform the second video processing task until after the frame of video data has been completely transferred to the first buffer 212. After the semaphore is acquired, the first GPU 120 executes the one or more GPU commands in a command 544 that configure the first GPU 120 to perform a second video processing task on the frame of video data transferred to first buffer 212. Referring again to the exemplary case, the one or commands in the command 544 configure the first GPU 120 to perform one or more post processing operations on the frame of video data.

In sum, in view of the exemplary case, the software driver 106 assigns the decoding task to the second GPU 130 and the post processing task to the first GPU 120. For the second GPU 130, the software driver 106 generates a command buffer similar to the command buffer 502. The second GPU 130 executes the command 510 to perform decoding. The second GPU 130 executes command 512 to transfer the decoded frame of video data from the second buffer 242 to the first buffer 212. Finally the second GPU 130 signals the first GPU 120 that decoding is completed by releasing a semaphore, according to the command 514. For the first GPU 120, the software driver 106 generates a command buffer similar to the command buffer 540. The first GPU 120 acquires the released semaphore by executing command 542. The first GPU 120 then performs the post processing operations on the decoded frame of video data in the first buffer 212 by executing command 544.

One advantage of the present invention is that the graphics subsystems 110 and 112 may have different video and graphics processing capabilities. The software driver is configured to take advantage of asymmetric graphics subsystems and asymmetric GPUs by matching a separate video processing task to the GPU best suited for that task. This approach enables the separate video processing to be performed serially by the GPUs in the system, which allows multiple frames of video data to be simultaneously processed to increase processing throughput. Also, the software driver 106 is configured to work with GPU memories of different sizes. One way different memory sizes is supported is by locating each buffer with a specific offset to facilitate transferring video data from one buffer to another.

Another advantage of the present invention is that since non-symmetric GPUs may be configured to share the video processing tasks, a computing device may be more easily upgraded. Even the addition of a smaller, less capable GPU may reduce the overall video image processing time, especially if the additional GPU includes a video processing unit that is absent from the GPU originally included in the computing device. For example, if a computing device includes a GPU that does not have a video processing unit, simply adding a GPU that has relatively limited functionality, but includes a video processing unit, may increase the video processing throughput of the computing device because the two GPUs can be configured to work together to process video data according to the teachings of the present invention described herein.

While the foregoing is directed to embodiments of the present invention, other and further embodiments of the invention may be devised without departing from the basic scope thereof. For example, more than two GPUs may be configured to perform the separate video processing tasks. Further, the distributed processing tasks may not be limited to video processing tasks. For example, the teachings of the present invention may be applied to accelerating 3-D rendering. In this case, the software driver 106 may be configured to separate 3-D rendering tasks and distribute them to the two or more GPUs within the computing device, according to the individual processing capabilities of those GPUs. In yet another alternative embodiment, each of the first GPU 120 and/or the second GPU 130 may be replaced by subsystem of two or more GPUs configured to work in parallel to process a single video frame. The architecture of such a subsystem is described in U.S. patent application Ser. No. 11/267,611, titled, "Video Processing with Multiple Graphical Processing Units," filed on Nov. 4, 2005, which is hereby incorporated by reference. The scope of the present invention is therefore determined by claims that follow.

A computer-readable medium storing instructions for causing a computing device to process video data by performing the steps of defining a first buffer in a first memory that is coupled to a first media processing device, wherein the first buffer is located within the first memory by a first offset, defining a second buffer in a second memory that is coupled to a second media processing device, wherein the second buffer is located within the second memory by a second offset, storing a frame of video data in the first buffer, and generating a first command buffer for the first media processing device and a second command buffer for the second media processing device, wherein each of the first command buffer and the second command buffer comprises a plurality of commands for processing the frame of video data.

We claim:

1. A system for processing video data, the system comprising:
    a host processor;
    a first media processing device coupled to a first buffer, wherein the first buffer is configured to store a frame of video data, and the first media processing device is configured to perform a first processing task on the frame of video data;
    a second media processing device coupled to a second buffer, wherein the second buffer is configured to store the processed frame of video data transferred from t he first buffer, and the second media processing device is configured to perform a second processing t ask on the processed frame of video data; and
    a system memory including a software driver configured to:
        determine that the first processing task should be assigned to the first media processing device based on a first set of processing properties associated with the first media processing device,
        determine that the second processing task should be assigned to the second media processing device based on a second set of processing properties associated with the second media processing device, and
        generate a first command buffer for the first media processing device and a second command buffer for the second media processing device, wherein each of the first command buffer and the second command buffer comprises a plurality of commands for processing the frame of video data.

2. The system of claim 1, wherein the first set of processing properties and the second set of processing properties are not the same.

3. The system of claim 1, wherein the frame of video data stored in the first buffer is an encoded frame of video data and the first processing task comprises decoding the frame of video data.

4. The system of claim 3, wherein the processed frame of video data stored in the second buffer is the decoded frame of video data, and the second processing task comprises a post processing operation.

5. The system of claim 1, further comprising a system interface coupled to each of the host processor, the first media processing device and the second media processing device and configured to enable transmissions between the host processor and each of the first media processing device and the second media processing device as well as between the first media processing device and the second media processing device.

6. The system of claim 5, wherein the system interface comprises a bridge device.

7. The system of claim 1, wherein the first command buffer includes a command for decoding the frame of video data stored in the first buffer, a command for transferring the decoded frame of video data to the second buffer, and a command for releasing a semaphore to the second media processing device.

8. The system of claim 7, wherein the second command buffer includes a command for acquiring the semaphore released by the first media processing device and a command for performing a post processing operation on the decoded frame of video data stored in the second buffer.

9. The system of claim 7, wherein the command for transferring the decoded frame of video data to the second buffer comprises a direct memory access command.

10. The system of claim 9, wherein the direct memory access command comprises a blit command.

11. The system of claim 1, wherein the first buffer is located within a first memory associated with the first media processing device by a first offset, and the second buffer is located within a second memory associated with the second media processing device by a second offset.

12. The system of claim 1, wherein the first media processing device includes processing elements configured to efficiently process the first processing task and the second media processing device includes different processing elements configured to efficiently process the second processing task.

13. The system of claim 1, wherein the software driver is further configured to separate a video processing task into the first processing task and the second processing task.

14. A method for processing video data, the method comprising:
    assigning a first processing task to a first media processing device based on a first set of processing properties associated with the first media processing devise;
    assigning a second processing task to a second media processing device based on a second set of processing properties associated with the second media processing device;
    generating a first command buffer for the first media processing device and a second command buffer for the second media processing device, wherein each of the first command buffer and the second command buffer comprises a plurality of commands for processing a frame of video data;

storing an encoded frame of video data in a first buffer that is coupled to a first media processing device;

decoding the frame of video data based on the first processing task;

transferring the decoded frame of video data to a second buffer that is coupled to a second media processing device; and performing a post processing operation on the decoded frame of video data based on the second processing task.

15. The method of claim 14, further comprising the step of transferring the processed frame of video data from the second buffer to a display device for display.

16. The method of claim 14, wherein the first command buffer includes a command for decoding the encoded frame of video data stored in the first buffer, a command for transferring the decoded frame of video data to the second buffer, and a command for releasing a semaphore to the second media processing device.

17. The method of claim 16, wherein the second command buffer includes a command for acquiring the semaphore released by the first media processing device and a command for performing a post processing operation on the decoded frame of video data stored in the second buffer.

18. A computer-readable medium storing instructions for causing a computing device to process video data by performing the steps of:

defining a first buffer in a first memory that is coupled to a first media processing device, wherein the first buffer is located within the first memory by a first offset;

defining a second buffer in a second memory that is coupled to a second media processing device, wherein the second buffer is located within the second memory by a second offset;

storing a frame of video data in the first buffer;

assigning a first processing task to the first media processing device and a second processing task to the second media processing device based on a first set of processing properties associated with the first media processing device and a second set of processing properties associated with the second media processing device; and generating a first command buffer for the first media processing device based on the first processing task and a second command buffer for the second media processing device based on the second processing task, wherein each of the first command buffer and the second command buffer comprises a plurality of commands for processing the frame of video data.

19. The computer-readable medium of claim 18, wherein the frame of video data stored in the first buffer comprises an encoded frame of video data, and the first command buffer includes a command for decoding the encoded frame of video data, a command for transferring the decoded frame of video data to the second buffer, and a command for releasing a semaphore to the second media processing device.

20. The computer-readable medium of claim 19, wherein the second command buffer includes a command for acquiring the semaphore released by the first media processing device and a command for processing the decoded frame of video data stored in the second buffer.

21. The computer-readable medium of claim 19, wherein the command for transferring the decoded frame of video data to the second buffer comprises a direct memory access command.

22. The computer-readable medium of claim 21, wherein the direct memory access command comprises a blit command.

23. The computer-readable medium of claim 18, further comprising the step of identifying the separate tasks that need to be performed to process the video data.

24. The computer-readable medium of claim 18, wherein the step of assigning the first processing task to the first processing device and the second processing task to the second processing device comprises the step of identifying the different processing units included within the first and second media processing devices.

25. The computer-readable medium of claim 18, further comprising the step of distributing the processing tasks to the first and second media processors based on which of the first and second media processors is best suited to perform each processing task.

* * * * *